United States Patent [19]

Shaparew

[11] 4,229,848
[45] Oct. 28, 1980

[54] BEE ESCAPE BOARD

[76] Inventor: Valadimir Shaparew, 3371 Trafalgar Rd. R.R.#1, Oakville, Ontario, Canada

[21] Appl. No.: 961

[22] Filed: Jan. 18, 1979

[51] Int. Cl.³ ............................................. A01K 47/06
[52] U.S. Cl. ........................................................ 6/4 B
[58] Field of Search .................................. 6/4 B, 4 R, 9

[56] References Cited

U.S. PATENT DOCUMENTS

| | | | |
|---|---|---|---|
| 945,407 | 1/1910 | Nichols | 6/4 R |
| 1,252,437 | 1/1918 | Hodgson | 6/4 B |
| 3,071,784 | 1/1963 | Kolb | 6/9 |
| 3,108,294 | 10/1963 | Brown, Jr. | 6/4 B |

*Primary Examiner*—Hugh R. Chamblee
*Attorney, Agent, or Firm*—Donald E. Hewson

[57] ABSTRACT

The specification discloses apiary devices, such as namely, bee escape boards. A bee escape board provides for efficient migration of bees within a period of about 24 hours from a beehive honey super to the brood chamber. The escape board includes a plurality of escape cells which can be in the form of hollow truncated cones, which cells provide for a relatively voluntary migration of bees, in contradistinction to forced removal of bees.

9 Claims, 5 Drawing Figures

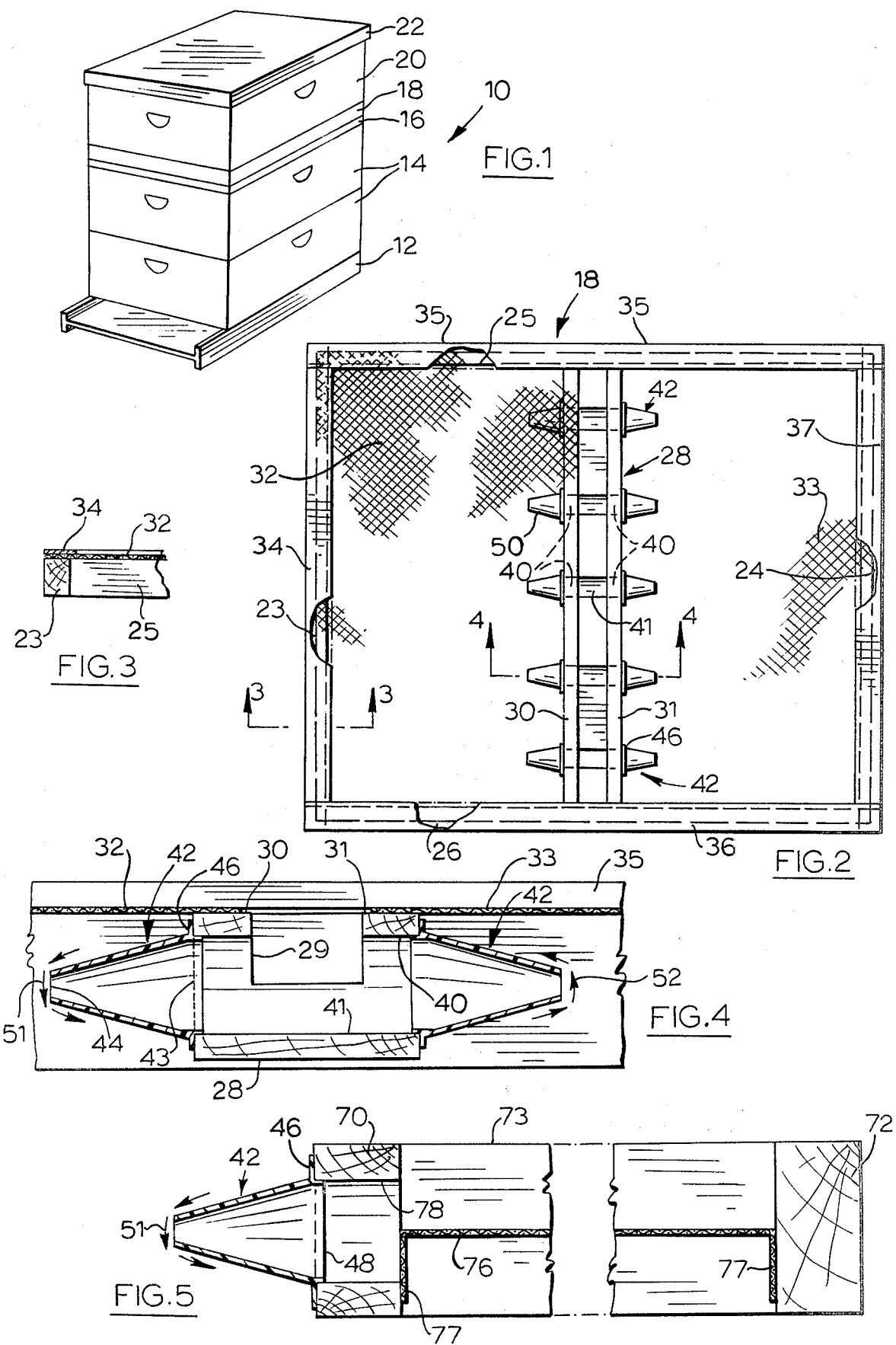

BEE ESCAPE BOARD

BACKGROUND OF THE INVENTION

The present invention is concerned with improvements in and relating to apiary devices. More particularly, the present invention relates to improvements relating to bee escape boards.

Bee escape boards serve to provide for migration or movement of bees in a beehive or to the outside thereof in a controlled manner. Usually, bee escape boards serve to permit egress of bees from one chamber or compartment in the beehive to another compartment or chamber, while simultaneously affording prevention of movement of the bees in the reverse direction.

Such bee escape boards are known and have been described in the prior art.

In one prior art proposal, as disclosed in U.S. Pat. No. 945,407 dated Jan. 4, 1910 to Nichols, there is provided a bee trap device making use of a slidingly disposed plate which serves to control a communication passage such that, in one position of the sliding plate, random access and return is provided for the bees between two adjoining chambers or compartments. In a second position of the sliding plate, the migration of bees is restricted to one direction by means of a wire-mesh cone having a central baffle to ensure exit of the bees in vertical direction from an upper compartment to a lower compartment. The use of baffles in the form of plates, either relatively rigid plates, or flexing plates, as also disclosed in U.S. Pat. No. 1,252,437 dated Jan. 8, 1918 to Hodgson and in U.S. Pat. No. 3,108,294 issued Oct. 29, 1963 to Brown, Jr., referred to as Porter bee escapes in the art, is not desirable. Primarily this is not desirable since the baffle plates or resilient escape blades tend to damage the wings of bees, or other critical body parts, since the force, particularly that of resilient plates, needed to be overcome by bees egressing from one compartment of the beehive to another, or to the outside, may lead to potential, often serious, injury of the bees.

Among other methods, the chemical vapours which are offensive to the bees have been used thereby to direct them to another location. Yet another method employs a compressed air blast to evacuate the honey supers, i.e., the compartment serving for the collection of the honey in the beehive.

The prior art devices and methods thus provide for relatively forceful bee evacuation or forced migration and there exists, accordingly, the need to provide an escape board which affords relatively voluntary bee escape or migration.

SUMMARY OF THE PRESENT INVENTION

It is a principal object of this invention to provide a bee escape board which is economically produced and which is easily installed and removed by the apiarist.

A further object of the present invention is to provide a bee escape board which is substantially rigid and without the need for movable parts.

A still further important object is the provision of a bee escape board which ensures quick and efficient evacuation of bees without endangering the bees passing therethrough.

In accordance with the present invention there is provided a bee escape board for providing a controlled migratory pathway for bees in a beehive from a chamber in said beehive, said escape board comprising: a frame structure adapted to be interposed between superimposed chambers of the beehive for the provision of a volumetric space with respect to the chamber from which bees are to migrate, said space affording quick dispersal of the bees on migrating along the migratory pathway; means substantially covering the frame opening of the frame structure, said cover means preventing migration from the chamber from which bees are to migrate; and a plurality of bee escape cells furnished in said frame, said escape cells providing for a voluntary migration of bees from the chamber from which the bees are to migrate while substantially preventing migration in reverse direction through said cells.

Also in accordance with the present invention there is provided a bee escape board for producing a controlled migratory pathway for bees, said bee escape board comprising: a frame structure including spacer bars secured to the frame structure: screen means substantially covering the frame opening of the frame structure, said screen means being retained by at least said spacer bars, said screen means preventing migration of bees through the escape board while simultaneously permitting passage of air therethrough; a distribution member disposed adjacent the screen means whereby said screen provides a passage for bees to said distribution member, said distribution member having openings for presenting a migratory pathway for bees through the bee escape board; and escape cells furnished adjacent the openings of the distribution member to permit voluntary migration of bees through the escape chamber while substantially preventing return through the escape cell in reverse direction, each of said cells including a first inlet opening permitting egress and return of the bees and a second exit opening permitting egress of the bees at a distance space apart from said first opening, said escape cell having a roughened internal surface for facilitating traversal by bees through the cells towards and through the exit opening.

Further in accordance with the present invention there is provided a bee escape board comprising: a generally rectilinear frame providing a frame opening and furnishing a volumetric space for dispersal of bees migrating through the escape board; at least one transverse distribution member extending between two oppositely disposed frame members of said frame structure, said distribution member including a channel member having an upwardly open longitudinally extending central groove therein and a plurality of transverse through holes in communication with said groove, said through holes providing openings communicating laterally outwardly of said distribution channel; a plurality of frusto-conical hollow escape cells secured to said distribution member, each cell having an inlet opening in communication with a respective outwardly presented opening of said through holes of said distribution member, said escape cells having horizontally tapered walls tapering from the inlet openings towards an exit opening for egress of bees therethrough, said exit opening being spaced apart from the entry opening and being positioned so as to be clear of any permanent support near said exit opening; and means for preventing migration of bees through the frame structure other than through the escape cells.

Also in accordance with the present invention there is provided a bee escape board comprising: a frame structure adapted to be interposed between adjacent chambers of a beehive; a plurality of through holes extending through the frame members; and bee escape cells in communication with the outwardly presented openings of the through holes, said escape cells including hollow truncated cone-shaped cells having an exit opening permitting migration of the bees to the atmosphere while substantially preventing migration of the bees in reverse direction.

In accordance with a preferred embodiment of the invention the escape cells include hollow frusto-conical or truncated cone shapes having an entry opening for the bees at the end of the cone having the larger diameter and an exit opening near the end of the cone having the smaller diameter.

In accordance with yet another embodiment of the present invention there are provided spacer bars for the bee escape board to retain the screen means on the frame structure.

In accordance with yet another preferred embodiment there is provided a bee escape board in which the escape cells project horizontally into the volumetric space provided by the frame structure and below a wire screen otherwise preventing migration through the escape board.

BRIEF DESCRIPTION OF THE DRAWINGS

These and other features and objects of the invention are further described hereafter with reference to the accompanying drawings, in which:

FIG. 1 is a perspective view of a beehive including a bee escape board in accordance with the present invention;

FIG. 2 is a top plan view of part of a bee escape board in accordance with one embodiment of the present invention;

FIG. 3 is a cross-section along line 3—3 in FIG. 2;

FIG. 4 is a cross-section along line 4—4 in FIG. 2;

FIG. 5 is a cross-section of an alternative embodiment of a bee escape board according to this invention.

DESCRIPTION OF THE SPECIFIC EMBODIMENTS

With reference to the perspective view of FIG. 1, a beehive 10 is positioned on a beehive entrance-providing base board 12. The beehive 10 is composed of brood chambers 14, two being shown in FIG. 1; it being understood that several such chambers can be employed. On top of the uppermost brood chamber 14 there is a queen bee excluder 16 of conventional configuration which need not be described for the understanding of the present invention. A bee escape board, generally designated by numeral 18, is disposed on top of the queen bee excluder 16, the escape board 18 having overall dimensions in width and length which are the same as those of the brood chambers 14. A honey super chamber 20 is positioned above the bee escape board 18 when this is in place as indicated in FIG. 1. A cover 22 is employed to cover the honey super chamber 20. As is known, the brood chambers 14 and the honey super 20 are of the same overall dimensions and they contain frames with wax combs, both not shown. The combs in the brood chambers 14 contain the feed for the bees while the combs in honey super chamber 20 contain pure honey. When the wax combs in the honey super chamber 20 are full of honey, the chamber 20 must be substantially devoid of bees before the honey can be removed.

In order to clear the chamber 20 of bees, bee escape board 18 is put in place as shown in FIG. 1. Bee escape board 18 provides for removal or egress of the bees from the honey super chamber 20 while simultaneously preventing ingress of bees into the honey super chamber 20, as will be described in greater detail below.

The bee escape board 18 is comprised of a frame constructed of a suitable weather-resistant material, e.g., lumber, the frame being composed of parallel spaced side frame members 23 and 24 which are joined by orthogonally disposed upper and lower frame members 25 and 26, respectively. While the bee escape board 18 in accordance with FIG. 1 is generally rectilinear, it will be appreciated that it can be of other suitable configuration to match the outline, in plan, of the beehive with which it will be employed. The frame can be joined by suitable fasteners, e.g., nails, and the corners can be joined by dove-tailing the ends of the frame members or similar securement.

Centrally within and parallel with respect to the side members 23 and 24 of the frame outlining the escape board 18, there extends a distributor or cross member 28. This cross member 28 may be of a height which is slightly less than the height of the frame members 23,24 and 25,26 although this is not a requirement. The cross member 28 is of a length sufficient to be secured to the frame members 25,26 by suitable fasteners, e.g., nails or similar fasteners. Merely by way of example, the cross member 28 has a width of 2 inches with a central groove 29 formed therein, leaving upwardly presented side walls 30 and 31, respectively. The groove has a suitable depth, preferably a depth of ⅝ of an inch.

Attached to the upper surfaces of the side walls 30 and 31 of the cross member 28 and to the frame members 23,24 and 25,26 are screens 32 and 33. Screen 32 is secured by spacer bar 34, secured by nails or the like, not shown, to the frame member 23, and is secured by spacer bars 35,36 in similar fashion to the upper and lower frame members 25 and 26, respectively. Screen 33, in turn, is secured by a spacer bar 37 which is secured to the frame member 24 by nails or the like, not shown, and by the spacer bars 35 and 36 which are secured to the upper and lower frame members 25 and 26.

The screens 32 and 33 provide a physical barrier for the bees between the honey super chamber 20 and the brood chamber 14. The openings of the screen are to be selected so as to permit flow of warm air from the broad chamber to circulate upwardly and thus keep the honey in the super chamber 20 warm and ready for extraction. Although any material permeable to air may be used, a screen of wire is preferred. Material for the screen which is not permeable to air, such as plywood, may also be used, except that this will prevent warm air from moving from below to the honey super chamber 20, so that the honey in the honey super chamber 20 cools to the temperature of the ambient air.

The spacer bars 34-37 provide a sufficient space for any built-up wax protruding at the bottom of the frame, not shown, containing the comb honey in chamber 20, and thus preventing the bottom of a frame with built-up wax from being supported by the screens 32 and 33.

As described thus far, escape board 18 presents a framed foraminous structure which permits passage of air between the brood chamber 14 and the honey super chamber 20. Preferably, the height of the escape board, as presented in FIG. 3, is approximately 1¾ inches, with the height of the frame members being approximately 1.5 inches. The height will normally be selected so that it affords a volumetric space for quick and efficient dispersal of the bees once they have migrated to below the escape board 18 from the chamber 20.

In order to permit the removal or migration of the bees from the super chamber 20 to the brood chamber 14, the cross member 28 is provided with a plurality of transverse passages in the form of through holes 40. The opening of each through hole 40 is of the order of about 1 inch which will be functionally adequate for most beehives. The through holes 40 are centrally disposed with respect to the height of the cross member 28, thus forming transverse semi-circular depressions 41 in the channel 29 of the member 28.

Each of the outlet openings formed by the through holes 40 in the lateral sides of the cross member 28 is covered by a bee escape cell 42. While the number of bee escape cells 42 is not overly critical, it has been observed that when using ten such cells, the honey super chamber 20 is substantially devoid of bees after a period of 24 hours. Fewer cells, generally, will increase the bee escape time while more cells will marginally reduce this time.

A typical bee escape cell 42 is shown in greater detail in FIG. 4 presenting a longitudinal cross-section thereof. Each cell consists of a hollow truncated cone or frusto-conical shape of defined critical dimensions. Each cell has a thin uniformly thick wall of a suitable material. Any conventional material may be used to produce the escape cells, however, for reasons of economics and in order to reduce the overall weight of the bee escape board, a weather-resistant, plastic material may be preferred.

As thus far described, there is provided a bee escape board which will permit, when installed as indicated in FIG. 1, the migration of bees through the groove 29, semi-circular depressions 41 and the through holes 40. The bees will then enter the escape cells 42 through the larger entry opening 43 and move towards the smaller exit opening 44 thereof. When the positioning and location of the bee escape cells 42 as described in the foregoing, the bees can migrate from the honey super chamber 20, or chambers if several are employed, into the brood chamber 14.

It has been observed that the bees migrating in this manner form a live bee bridge in the space at the exit opening 44 to provide bodily support for succeeding bees. As soon as all the bees have escaped, this bridge is disassembled, thus removing the direct support for a reentry of the bees in reverse direction from the brood chamber 14 to the honey super chamber 20. The reentry of bees upwardly and horizontally into the escape cells 42 through the smaller exit opening 44 of the cells 42 is limited in view of the size of the opening and the physical capabilities of the bees to negotiate the required return. In other words, the bees are not capable of returning due to the particular shape of the cell 42, and their only course is that which is schematically indicated by the arrows 51 and 52 in FIG. 4 and arrow 53 in FIG. 5 of the drawings. Along this course the bees just pass over the exit opening 44 of the cells 42 and they are not capable of bending sufficiently to return into the honey super chamber 20 of the beehive 10.

Despite such effective removal of the bees once they have migrated from the chamber 20, it has been observed that after a period of about one week, the bees will, in some rare instances, build up wax ridges or platforms from below to afford reentry in a straight line manner through the exit opening 44 of an escape cone or cell 42 by the use of this newly established support.

Accordingly, after a period of approximately one to two days, the escape board 18 is removed, and the honey super chamber 20 may be taken away from the brood chambers 14. It is, however, important to note that the escape cells 42 provide a voluntary bee escape means, as opposed to forced removal devices or methods.

As has been indicated in the foregoing, the configuration and sizing of the escape cells 42 is important.

The exit opening 44 which is preferably in the same plane as the smaller diameter of the hollow truncated cone-shaped cell 42, must restrict or substantially prevent return of bees and must not be larger than about $\frac{1}{2}$ inch, nor less than about $\frac{1}{4}$ inch, the preferred size thereof being about 5/16 inch, thus preventing reentry. However, the diameter must nevertheless be large enough for the bees to pass therethrough as aforesaid. The entry opening 43 into a cell 42, which is preferably in the same plane as the larger diameter of the cone, may be selected so that the bees can easily and comfortably enter the cell 42.

The overall height or length of a cell 42 must normally not be less than $\frac{3}{8}$ inches, and the nominal length is preferably 1.25 inches.

The angle of inclination of the walls of a cell 42 with respect to the longitudinal axis of the cell can be from about 0° to about 45°, and is preferably 15°. Thus, the length or height of the cone and the angle of inclination of the walls with respect to the axis of the cone can be selected as required, with the proviso that the length and the angle are not both of zero value, i.e., forming a flat plate having a hole therein. This is not functional for the purpose in question.

The inner wall surface of the hollow truncated cone of cell 42 should be somewhat rough to provide a surface on which the bees can readily traverse. The cell 42 will perform satisfactory when oriented vertically, horizontally or in any intermediate inclined position.

Preferably, the cells 42 are furnished with an external peripheral flange 46 at the entry opening 43. This flange 46 can be used to attach the cell to the cross member 28 by means of glue, staples, nails, or the like, not shown. Furthermore, a hollow cylindrical collar 48, about 1/16 of an inch long, extending rearwardly of opening 43, can be provided for each cell, as is indicated in FIG. 5 of the drawings. Such a collar 48 will facilitate the locating in the through holes 40 of the individual cells 42 for assembly.

The entry and exit openings 43 and 44, respectively, are preferably circular. However, it will be obvious that other shapes of openings capable of performing similar to circular openings are included in the scope of the present invention. Thus, the openings may be hexagonal, octagonal or of other suitable shape.

A further embodiment of the present invention is shown in FIG. 5 of the drawings. In this embodiment, a rectangular frame is formed by frame members 70, 72 and 73, 74 with a foraminous screen 76 extending between the frame members to substantially cover the rectangular frame opening. Screen 76 can be secured with downwardly projecting flange portions 77, being secured by staples, nails or the like, not shown, to the inner wall surfaces of the frame members 70 to 74, so that the upwardly presented surface of the screen 76 is approximately at the median height of the frame members. One, or several, of the frame members is provided with transverse through holes 78 extending at the median height of the respective frame member. Bee escape cells such as 61 are secured by flanges 46 to the outer surfaces of the respective frame members using staples, nails or the like, not shown, as fasteners. Any quantity of the escape cells 61 may be provided with attendant through holes 78 in any of the frame members as required.

It is important that the distance from the perimeter of the exit opening 44 to any permanent support in the beehive is at least ⅜ of an inch to ensure that the bees can not use such a permanent support for reentry through the cells 42 or 61, respectively.

As disclosed in the foregoing, the invention provides a number of important advantages. Thus, the escape board in accordance with the invention is of a simple static design without any moving parts which would tend to jam or otherwise become inoperative due to repeated exposure to the outdoors. The bees are not liable to be injured when passing through the escape cells and a quick and efficient evacuation of bees from the honey super chamber is readily achieved. Furthermore, the escape board provides a voluntary bee escape, as opposed to forced escape methods. As described, the bee escape board provides for primarily horizontal escape passage which are readily traversed by the bees and which enhance the natural migration of bees from the honey super chamber.

Other embodiments and variations are, of course, possible and other materials than those mentioned may be used, without parting from the spirit and scope of the appended claims.

The embodiments of the invention in which an exclusive property or privilege are claimed:

1. A bee escape board for providing a controlled migratory pathway for bees from a chamber of a beehive, said bee escape board comprising:
    a frame structure including pairs of opposed side members defining an opening;
    screen means substantially covering said frame opening of said frame structure and secured thereto; said screen means preventing migration of bees from a first side of said escape board to a second side thereof, while simultaneously permitting passage of air therethrough;
    a distribution disposed within said frame structure and supported between a pair of opposed side members adjacent the screen means whereby said screen provides a transverse opening for bees to enter said distribution members, said distribution member having a longitudinal channel therein communicating with a plurality of through holes provided in said distribution member perpendicular to said channel to provide a migratory pathway for bees through the escape board; and
    bee escape cells of hollow frustoconical shape secured to said distribution member at each said through hole in said distribution member and projecting therefrom so as to permit voluntary migration of bees therefrom, while substantially preventing their return in the reverse direction; each said escape cell including a first ingress opening and a second egress opening smaller than said ingress opening at a distance spaced therefrom.

2. A bee escape board in accordance with claim 1, wherein said bee escape cells project from said distribution member which is positioned substantially centrally in said frame structure.

3. A bee escape board in accordance with claim 1, wherein said ingress and egress openings of said bee escape cells extend in the samd plane as the respective ends thereof.

4. A bee escape board in accordance with claim 3, wherein said egress opening of each said bee escape cell is of a size from about ¼ inch to about ½ inch.

5. A bee escape board in accordance with claim 3, wherein the ingress opening of each said bee escape cell is of a size of about 1 inch.

6. A bee escape board in accordance with claim 3, wherein the length of each said bee escape cell is from approximately ⅜ inch to approximately 1.5 inches.

7. A bee escape board in accordance with claim 3, wherein each said bee escape cell includes a collar extending rearwardly therefrom.

8. A bee escape board in accordance with claim 3, wherein the walls of the hollow cone of each said bee escape cell are inclined with respect to the longitudinal axis of said hollow cone at an angle of from slightly more than 0° to about 45°.

9. A bee escape board in accordance with claim 8, wherein the angle of inclination of said hollow cone walls of said bee escape cells is about 15°.

* * * * *